United States Patent Office 3,454,861
Patented July 8, 1969

3,454,861
BATTERY CHARGING SYSTEMS FOR USE IN ROAD VEHICLES
Maurice James Wright, Birmingham, England, assignor to Joseph Lucas (Industries) Limited, Birmingham, England
Filed Nov. 28, 1966, Ser. No. 597,450
Claims priority, application Great Britain, Dec. 13, 1965, 52,781/65
Int. Cl. H02j 7/10
U.S. Cl. 320—48                           2 Claims

ABSTRACT OF THE DISCLOSURE

In a battery charging system having a generator, a battery and a voltage regulator, the voltage regulator has two parts, one of which senses the battery voltage and the other of which controls the generator output. The part sensing the output voltage is connected across the battery in series with a warning lamp and the ignition switch, and the part controlling the output is connected across the series combination of warning lamp and first part. When a generator produces an output, a switch is closed to by-pass the ignition switch and warning lamp and so connect the first part directly across the battery.

---

This invention relates to a battery charging system for use in a road vehicle.

A system according to the invention comprises in combination a pair of terminals between which the battery is connected in use, a generator for charging the battery, a voltage regulator for controlling the output of the generator, said voltage regulator comprising a first part which actually senses the output voltage of the generator, and a second part which actually controls the output voltage of the generator, said second part of the voltage regulator being connected across said pair of terminals in series with the ignition switch of the vehicle, and said first part being connected across said pair of terminals in series with the ignition switch and a warning lamp, the system further including switch means operable when the generator is producing an output to by-pass the series circuit constituted by the ignition switch and warning lamp.

Figure 1:
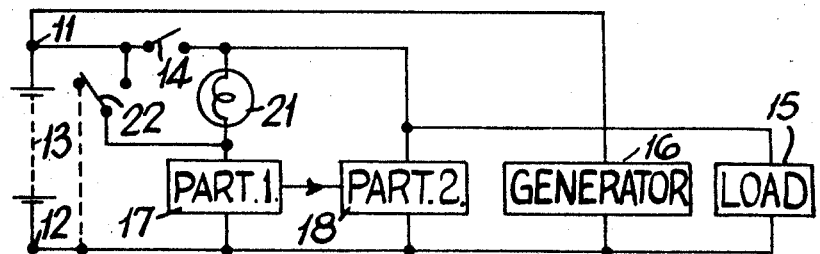
Figure 2:
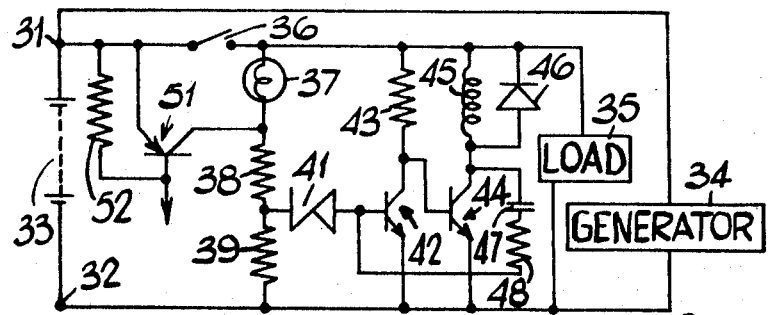
Figure 3:
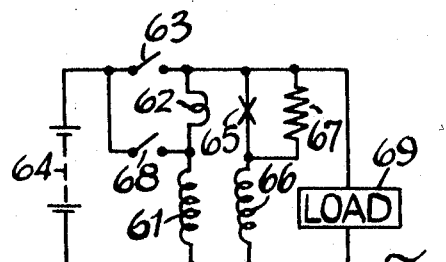

In the accompanying drawings, FIGURE 1 is a block diagram illustrating one example of the invention, and FIGURES 2 and 3 respectively are circuit diagrams illustrating two detailed examples of the invention.

Referring to FIGURE 1, there are provided terminals 11, 12 between which a battery 13 is connected in use. The terminals 11, 12 are connected through an ignition switch 14 to a load 15, and a generator 16 driven by the engine charges the battery and for this purpose is connected across the terminals 11, 12. The generator can be a dynamo and cut out, or an alternator with a full wave rectifier.

The output voltage of the generator is controlled by a voltage regulator which consists of a first part 17 which actually senses the output voltage of the generator, and a second part 18 which controls the flow of current to the field winding of the generator and is itself controlled by the part 17. The part 17 is connected across the terminals 11, 12 in series with the ignition switch 14 and a warning lamp 21, whilst the part 18 is connected across the terminals 11, 12 in series with the ignition switch 14. A further switch 22 is connected between the junction of the lamp 21 and part 17 and the terminal 11.

The switch 22 is normally open, and before the ignition switch 14 is closed, no current flows anywhere in the system. When the ignition switch 14 is closed, the warning lamp 21 is energised through the part 17 of the voltage regulator, and the field winding is also energised. As soon as the generator 16 produces an output the switch 22, which is operated by the generator 16, is closed so that the part 17 of the voltage regulator is connected directly across the battery 13, instead of through the ignition switch 14. At the same time, the warning lamp 21 is extinguished.

In a modification (indicated in dotted lines) the switch 22 serves when the generator is not producing an output to by-pass the part 17 of the regulator, so that the lamp 21 is connected across the battery through the switch 14.

Referring now to FIGURE 2, there are provided a pair of terminals 31, 32 between which the battery 33 of the vehicle is connected in use. Connected across the terminals 31, 32 is a generator 34, which may be a dynamo and cut out but preferably is an alternator with a full wave rectifier associated therewith. A load 35 to be operated by the battery is connected across the battery in series with the ignition switch 36 of the vehicle.

Connected across the terminals 31, 32 in series with the ignition switch 36 is a potentiometer chain comprising a warning lamp 37, and resistors 38, 39. A point intermediate the resistors 38, 39 is connected through a Zener diode 41 to the base of an n-p-n transistor 42, the emitter of which is connected to the terminal 32 and the collector of which is connected to the terminal 31 through a resistor 43 in series with the ignition switch 36. The collector of the transistor 42 is further connected to the base of a second n-p-n transistor 44 having its emitter connected to the terminal 32, and its collector connected to the terminal 31 through the field winding 45 of the generator 34 in series with the ignition switch 36, a diode 46 being connected across the field winding to conduct back E.M.F. The field winding 45 may be connected directly to the terminal 31 instead of through the ignition switch 36, and in this connection it will be noted that the second part 18 described in FIGURE 1 is constituted in FIGURE 2 by the base-emitter drive circuit of the transistor 44. The collector of the transistor 44 is further connected to the base of the transistor 42 through a capacitor 47 in series with the resistor 48.

A point intermediate the warning lamp 37 and resistor 38 is connected to the collector of a p-n-p transistor 51, the emitter of which is connected to the terminal 31, and the base of which is connected to the terminal 31 through a resistor 52. The base of the transistor 51 is further associated with the generator as indicated by the arrow, and the arrangement is such that the transistor 51 is bottomed when the generator 34 is charging the battery. Where the generator is an alternator, the actual base connection can be to the star point by way of a resistor, or to a phase point by way of a smoothing circuit.

In operation, when the ignition switch 36 is open, no current flows in any part of the circuit. When the ignition switch 36 is closed, the transistor 44 is bottomed by current flowing through the resistor 43, and supplies field current to the winding 45. At the same time, the warning lamp 37 is illuminated by current flowing through it and the resistors 38, 39. If desired, an additional resistor may be connected in parallel with the resistors 38, 39 to increase the current flowing through the warning lamp. When the generator 34 is charging the battery, the switch constituted by the transistor 51 closes, and so the resistors 38, 39 are connected between the terminals 31, 32, and at the same time the warning lamp 37 is short-circuited and so is extinguished.

When the output voltage of the generator is below a predetermined value, the Zener diode 41 does not conduct, and the transistor 44 conducts permanently to provide field current to the winding 45. When the predetermined value is reached, the Zener diode 41 breaks down and provides base current to the transistor 42, which starves the transistor 44 of base current flowing through the resistor 43. The circuit therefore switches to a state with the transistor 42 bottomed and the transistor 44 off, so that no current flows in the winding 45. By virtue of the feedback connection through the capacitor 47 and resistor 48, the circuit operates between its two alternative states, and so a pulsating current flows in the winding 45. The relative periods of conduction of the transistors 44, 42 are determined by the current flowing through the Zener diode 41, so that the greater the output voltage of the generator 34, the less the mean current flowing through the winding 45.

FIGURE 3 illustrates the application of the invention to a standard electromechanical regulator. The first part of the regulator is a voltage sensing coil 61 connected in series with a warning lamp 62 and ignition switch 63 across the battery 64. The second part is the pair of contacts 65 which are operated by the coil 61 to control current flow through the switch 63 to the field winding 66. The usual resistor 67 is connected across the contacts 65, and the series circuit 62, 63 is bridged by a generator-controlled switch 68 as described in FIGURE 1. The load is shown at 69.

The invention can also be applied to diesel-engined vehicles, and in this respect it should be noted that the term "ignition switch" is used to include the load-controlling switch provided on diesel-engined vehicles. In fact, the load-controlling switch is commonly called an ignition switch, even though there is no ignition circuit.

Having thus described my invention what I claim as new and desire to secure by Letters Patent is:

1. A battery charging system for use in a road vehicle, comprising in combination a battery, a generator for charging the battery, a voltage regulator for controlling the output of the generator, said voltage regulator comprising a first part which actually senses the output voltage of the generator, and a second part which actually controls the output voltage of the generator, said first part being connected across said battery in series with a warning lamp and the ignition switch, and said second part of the voltage regulator being connected across the series combination of said warning lamp and said first part, the system further including switch means operable when the generator is producing an output to by-pass the series circuit constituted by the ignition switch and warning lamp so as to connect said first part directly across said battery, 2. A system as claimed in claim 1 in which said switch means occupies a first position when the generator is not producing an output and when the generator produces an output is moved to a second position in which it by-passes the series circuit constituted by the ignition switch and warning lamp, said switch means serving when in said first position to by-pass said first part of the regulator.

References Cited

UNITED STATES PATENTS

| | | | |
|---|---|---|---|
| 2,908,854 | 10/1959 | Rice | 320—40 |
| 3,293,536 | 12/1966 | Byles | 320—64 X |

JOHN F. COUCH, *Primary Examiner.*

S. WEINBERG, *Assistant Examiner.*

U.S. Cl. X.R.

320—61; 322—28, 99